April 2, 1940.    P. A. RAICHE    2,195,424
DUSTING POWDER
Filed July 24, 1935    3 Sheets-Sheet 1

Inventor
Paul A. Raiche
By Nathaniel Frucht
his Attorney

April 2, 1940. P. A. RAICHE 2,195,424
DUSTING POWDER
Filed July 24, 1935 3 Sheets-Sheet 2
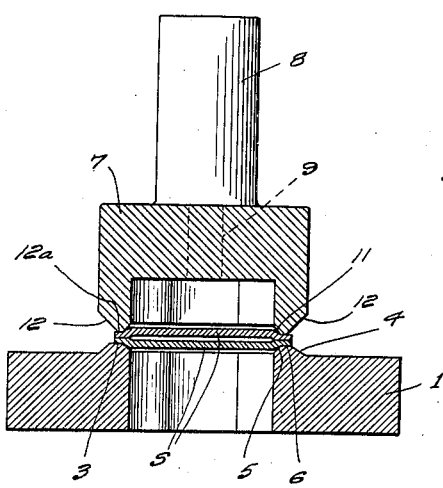
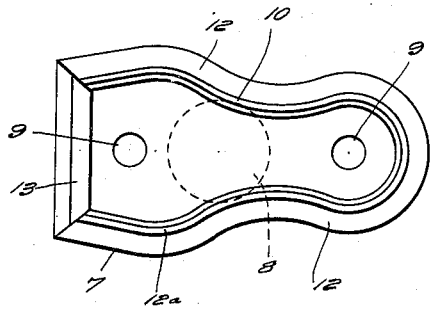
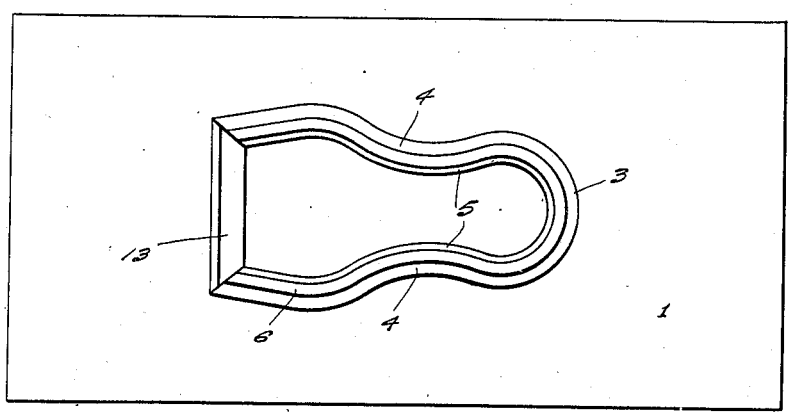

April 2, 1940.  P. A. RAICHE  2,195,424
DUSTING POWDER
Filed July 24, 1935  3 Sheets-Sheet 3

Inventor
Paul A. Raiche
By Nathaniel Frucht
his Attorney

Patented Apr. 2, 1940

2,195,424

UNITED STATES PATENT OFFICE 2,195,424

DUSTING POWDER

Paul A. Raiche, North Providence, R. I.

Application July 24, 1935, Serial No. 32,963

2 Claims. (Cl. 18—47)

My present invention relates to the rubber art, and has particular reference to the manufacture of nipples and other rubber articles.

The manufacture of nipples has involved a plurality of operations, including many hand operations. The sheets of rubber have heretofore been blanked in multiple, to provide two sections which have been cemented at the edges, then opened at the end, then seamed, inspected, cemented at the open end, curled at the open end to form a roll, mounted on curing forms, cured, and finally stripped from the forms.

It is the principal object of my invention to simplify the manufacture of nipples and similar articles by reducing the operations required, without sacrifice of quality in the resulting product.

To this end, I have devised a method and an apparatus for forming a nipple blank which can be cured, thus eliminating the greater part of the operations now found necessary. I have also provided means for smoothing the nipple surface, to eliminate all manufacturing marks, roughnesses, or blemishes.

With the above and other objects and advantageous features in view, my invention consists of a novel method and a novel arrangement of parts, more fully disclosed in the detailed description following, in conjunction with the accompanying drawings, and more specifically defined in the claims appended thereto.

In the drawings,

Fig. 3 is a section on the line 3—3 of Fig. 1;

Fig. 4 is a bottom plan view of the upper die;

Fig. 5 is a top plan view of the lower die;

Figure 1:
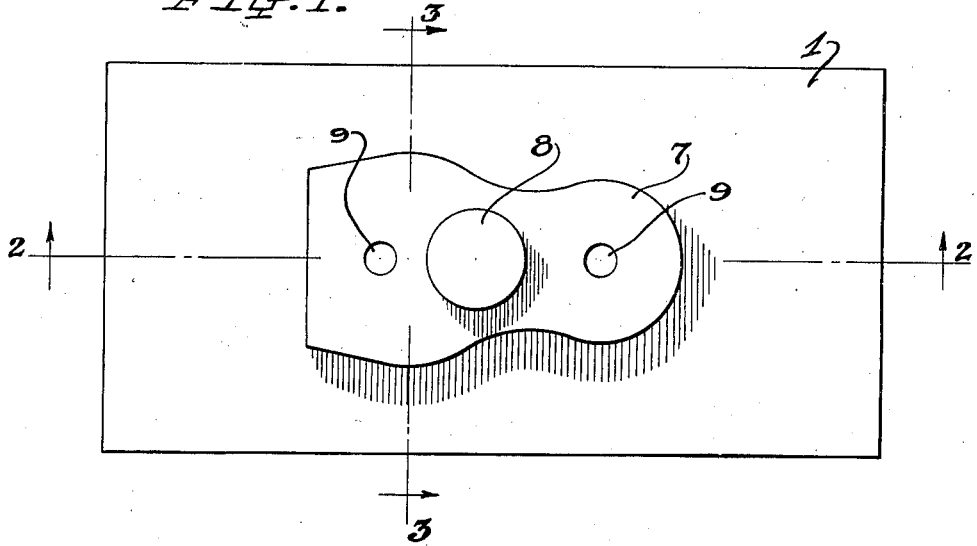
Fig. 1 is a top plan view of one construction of forming dies.

In proceeding in accordance with the present invention, a lower or bed die 1 is employed having an opening 2 which latter conforms in outline to that of the article to be formed. The upper face of the die is formed with a rib 3 bevelled at 4 and 5 on its outer and inner faces respectively and having a flat and relative narrow land 6.

The upper or pressure applying die 7 has a stem or shank 8 for securement in the reciprocating head of any well known form of press and preferably has air openings 9. The die 7 also has a rib 10 the inner and outer faces 11 and 12 of which are bevelled in a manner corresponding to the bevelling of the bed or lower die.

The bevelling of the sides of the rib 10 leave a narrow land 12a which latter registers with the land 6 of rib 3 of the lower bed die and is of slightly less width than the latter.

Figure 2:
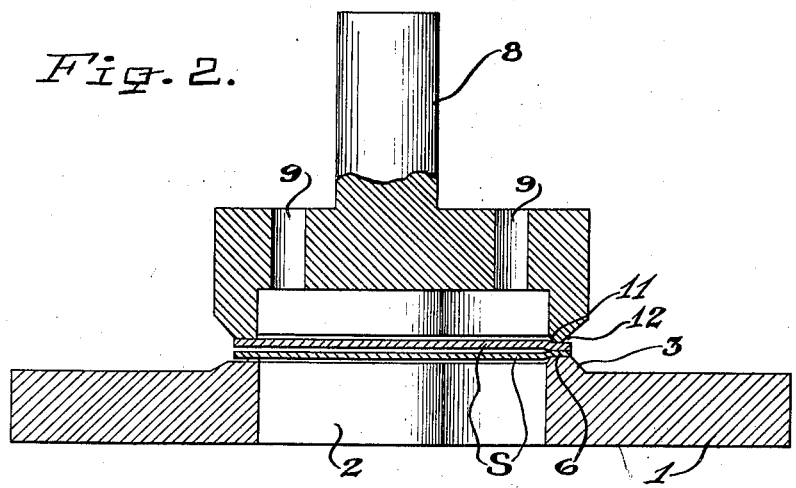
Fig. 2 is a section on the line 2—2 of Fig. 1.

In operation, two uncured rubber sheets S, which may be trimmed previously or subsequent to connection are placed on the lower, or bed die in the position illustrated in Figures 2 and 3 of the drawings. The upper or pressure applying die is then lowered and brought into forcible contact with the uppermost of the two rubber sheets, causing pressure to be applied to the two sheets and union thereof effected along lines in register with the lands 6 and 12a of the two dies. The rubber sheets are thus easily and quickly united along relatively narrow lines, the pressure of the dies on the rubber sheets being confined to the narrow lines defined by the lands 6 and 12a. The dies are hot, the temperature depending on the grade of stock, and ranging from 105° F. to 290° F.; the more plastic the stock, the lower the temperature. The pressure is great enough to substantially squeeze out the rubber between the lands, thus leaving a very small bead, and for a four die press should be in the neighborhood of four tons.

As there are no ribs on the large end 13 of the dies, this end of the nipple will be left open, that is, the dies will not act to unite the two sheets of rubber at this point.

The upper die may be operated as many times as may be required, due to the thickness of the rubber sheets in order to effect the desired union of the parts.

It is particularly to be noted that due to the bevelling of the ribs of the dies, the points of contact with the material occur but over a very small part of the surfaces of the two rubber sheets.

Figure 6:
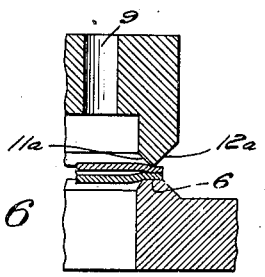
Fig. 6 is an enlarged detail of a modified land arrangement.

If desired, the upper die may be bevelled as indicated in Fig. 6, the inner face 11a and the outer face 12a forming a sharp edge which cooperates with the land 6 to produce a line union of the two sheets; any surplus is trimmed off due to the sharp upper die.

The above described pressure unions produce nipple blanks that may be cured without further manufacturing operation; the amount of the stock, its quality, and the temperature of curing must be very carefully gauged, to prevent the formation of a perceptible join bead.

Although the above described manufacture is satisfactory, I have found it feasible to provide an alternative manufacture which ensures a perfect product, having uniform cross-section at any point along its length. I have therefore provided two dies, an upper die 14 and a lower die 15, and a cooperating former 16, which as illustrated in Figs. 7 to 10 includes a nipple form 17, a recess 18, and a shank 19, the shank being bored to receive the usual pin of a curing frame.

Figure 7:
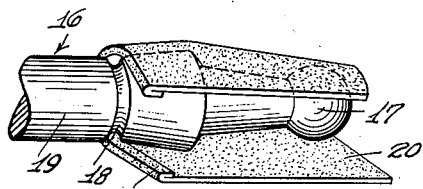
Fig. 7 is a perspective view of a novel former and one type of sheet blank.
Figure 8:
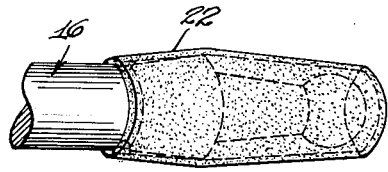
Figs. 8 and 9 are similar views, illustrating different sheet blanks utilizable therewith.
Figure 9:
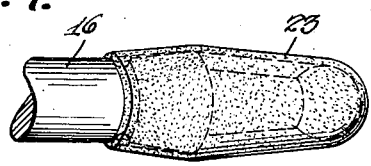
Figure 10:
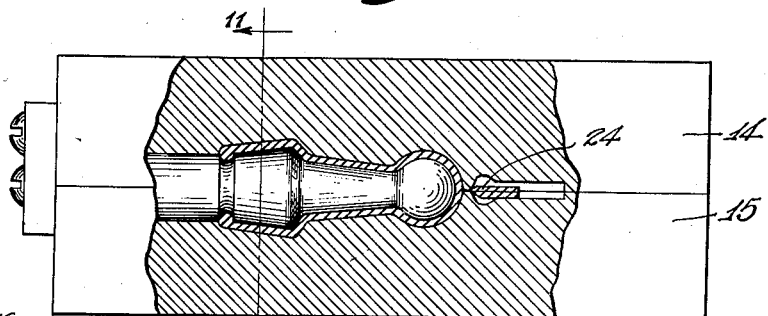
Fig. 10 is a sectional detail of a die construction showing the molding of a sheet blank.
Figure 11:
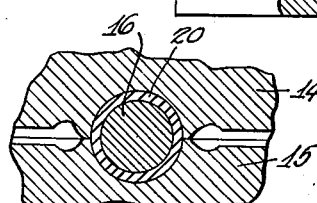
Fig. 11 is a side elevation showing the resulting molded nipple on the former.

I use a blank such as rubber sheet 20, see Fig. 7, which has one end 21 turned over to form a thickened edge, or I may use a rubber tube 22, see Fig. 8, or a rubber cap 23, see Fig. 9, each preferably having a thickened edge as shown. The former and the blank is inserted in the lower die, and the upper die is pressed into engagement, as indicated in Fig. 10, whereby the blank is shaped into a nipple blank and the surplus is trimmed off. The blank is of sufficient thickness to exactly fill the space between the former and the die. The pressure on the blank between the former and the dies produces a rubber flow which completely fills the available space, and produces a nipple blank having a rubber section of uniform thickness at any point of its length. The dies are preferably heated at from 105° F. to 290° F.; moreover, as many dies may be provided, preferably in parallel relation, as can be conveniently handled by the workmen.

Figure 12:
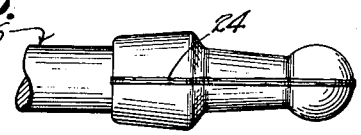
Fig. 12 is a view, similar to Fig. 9, but illustrating the swaging die.
Figure 13:
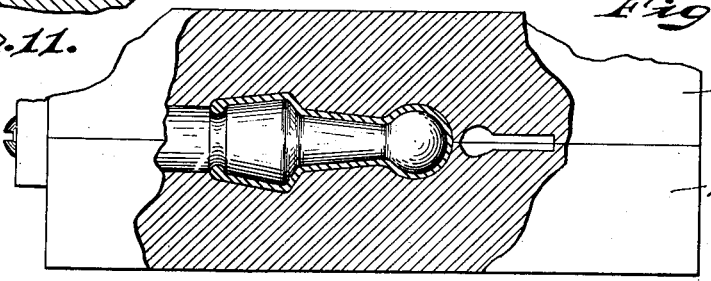
Fig. 13 is a view of the resulting nipple blank ready for the curing operation.
Figure 14:
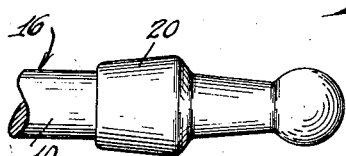

The resulting nipple blank may have a slight bead or edge 24, see Fig. 12, at the region of the die lands, although the rubber content of the blank may be gauged to exactly fill the available space. The nipple blank and former are then turned a quarter turn, and pressed between a second set of shaping dies, 25, 26, see Fig. 13, these being ground to present a smooth area adjacent the bead location. This second shaping distributes excess material so as to eliminate any beads or edges, and to fill any grooves or regions of reduced or enlarged cross-section, whereby the resulting shaped nipple blank is perfectly formed, and is ready for curing.

A further forming is possible during the curing operation, whereby nipples made in accordance with the first described manufacture, and also with the second described manufacture, may be smoothed. This is accomplished by using a dusting powder which contains a flux or ingredient capable of producing an initial running or flow of the rubber, and an accelerator, or second ingredient for producing a very slightly delayed, but quick, set of the rubber, whereby all surface inequalities are smoothed out. The preferred ingredients for obtaining these results are zinc stearate for the flux, and an accelerator of standard type, which are used in the form of a composite comminuted dusting powder, a suitable proportion being half and half. The curing temperature is in the neighborhood of 290° F., and at about 85 lbs. pressure; the nipple shrinks slightly during the curing, so as to set in the exact shape of the former, thus ensuring uniformity of the finished products, as the forms are all exact duplicates.

While I have described specific arrangements for producing the desired formation of nipple blanks, the arrangements may be extended to other articles for which smooth exteriors are required, and may include plastic materials other than rubber, but of a similar nature. Desired changes in the shape of the dies, in the structure of the dies and the number used, in the sheet blanks used, and in the ingredients utilized for the final smoothing during the curing operation, may be made to suit different article requirements, within the spirit and the scope of the invention as defined in the appended claims.

I claim:

1. A dusting powder for rubber articles to be cured, containing a flux for producing an initial running of the rubber surface during curing, and an accelerator for producing a set of said rubber surface immediately subsequent to said initial running.

2. A dusting powder for rubber articles to be cured, containing zinc stearate for producing an initial running of the rubber surface during curing, and an accelerator for producing a set of said rubber surface immediately subsequent to said initial running.

PAUL A. RAICHE.